US012578083B1

(12) United States Patent
Jiang

(10) Patent No.: US 12,578,083 B1
(45) Date of Patent: Mar. 17, 2026

(54) STAGE LIGHTING APPARATUS WITH ADJUSTABLE LIGHTING PROPERTIES AND ADJUSTMENT METHOD THEREFOR

(71) Applicant: Suzhou University of Science and Technology, Suzhou (CN)

(72) Inventor: Xueming Jiang, Suzhou (CN)

(73) Assignee: Suzhou University of Science and Technology, Suzhou (CN)

( * ) Notice: Subject to any disclaimer, the term of this patent is extended or adjusted under 35 U.S.C. 154(b) by 0 days.

(21) Appl. No.: 19/300,377

(22) Filed: Aug. 14, 2025

Related U.S. Application Data

(63) Continuation of application No. PCT/CN2024/123550, filed on Oct. 9, 2024.

(30) Foreign Application Priority Data

Sep. 18, 2024 (CN) ......................... 202411296391.6

(51) Int. Cl.

| | |
|---|---|
| ***F21V 21/30*** | (2006.01) |
| ***F21V 3/02*** | (2006.01) |
| ***F21V 17/00*** | (2006.01) |
| ***F21V 19/00*** | (2006.01) |
| ***F21V 19/02*** | (2006.01) |
| ***F21V 21/15*** | (2006.01) |
| *F21W 131/406* | (2006.01) |

(52) U.S. Cl.

CPC ................ *F21V 19/02* (2013.01); *F21V 3/02* (2013.01); *F21V 17/002* (2013.01); *F21V 19/008* (2013.01); *F21V 21/15* (2013.01); *F21V 21/30* (2013.01); *F21W 2131/406* (2013.01)

(58) Field of Classification Search

CPC . F21W 2131/406; F21V 17/002; F21V 21/15; F21V 21/30; F21Y 2107/10; F21Y 2107/20

See application file for complete search history.

(56) References Cited

U.S. PATENT DOCUMENTS

| | | | | |
|---|---|---|---|---|
| 6,416,195 B1 * | 7/2002 | Lin | ......................... | F21S 10/02 362/811 |
| 9,581,299 B2 * | 2/2017 | Chien | ..................... | F21K 9/232 |
| 2016/0209013 A1 * | 7/2016 | Chien | ..................... | F21V 14/02 |

FOREIGN PATENT DOCUMENTS

| | | |
|---|---|---|
| CN | 211118963 U | 7/2020 |
| CN | 218001391 U | 12/2022 |
| CN | 221076335 U | 6/2024 |

* cited by examiner

*Primary Examiner* — Sean P Gramling
(74) *Attorney, Agent, or Firm* — Nitin Kaushik

(57) ABSTRACT

The present disclosure provides a stage lighting apparatus with adjustable lighting properties and an adjustment method therefor, and relates to the field of stage lighting apparatuses and enables convenient switching between two lighting states. The apparatus comprises a base, with a support frame fixedly connected to an upper end of the base. Two ends of the support frame are movably connected to a hemispherical shell A via rotating shafts. One side of the hemispherical shell A is snap-fitted to a hemispherical shell B. A rotating mating post B is movably disposed at lower ends of the hemispherical shell A and the hemispherical shell B. A servo motor is fixedly connected to a middle portion of the support frame.

10 Claims, 11 Drawing Sheets

STAGE LIGHTING APPARATUS WITH ADJUSTABLE LIGHTING PROPERTIES AND ADJUSTMENT METHOD THEREFOR

CROSS-REFERENCE TO RELATED APPLICATIONS

The application claims priority to Chinese patent application No. 202411296391.6, filed on Sep. 18, 2024, the entire contents of which are incorporated herein by reference.

TECHNICAL FIELD

The present disclosure relates to the field of stage lighting apparatuses, and in particular, to a stage lighting apparatus with adjustable lighting properties and an adjustment method therefor.

BACKGROUND

A stage lighting apparatus controls changes in light color to display the environment, render the atmosphere, highlight the central characters, and create a sense of space and time on stage. The apparatus shapes the external image of the stage performance, thereby providing the necessary lighting effects. Stage lighting constitutes an important part of the performance space. According to the development of the plot, comprehensive lighting design is implemented to create the visual environment for characters and specific scenes as needed. The design intent is purposefully conveyed to the audience by visual imagery as an artistic creation. Therefore, stage lighting features various colors and diverse light shapes, with spherical lighting and columnar lighting being widely used.

The existing stage lighting apparatuses can only provide one lighting state, either spherical lighting or columnar lighting, and these two states cannot be switched between each other, failing to meet current requirements.

SUMMARY

An object of the present disclosure is to provide a stage lighting apparatus with adjustable lighting properties and an adjustment method therefor, to solve the technical problem of the inability to switch between a spherical lighting state and a columnar lighting state in the stage lighting apparatus described in the background art above.

A first aspect of the present disclosure provides a stage lighting apparatus with adjustable lighting properties, comprising a base, wherein a support frame is fixedly connected to an upper end of the base, two ends of the support frame are movably connected to a hemispherical shell A via rotating shafts, one side of the hemispherical shell A is snap-fitted to a hemispherical shell B, and a rotating mating post B is movably disposed at lower ends of the hemispherical shell A and the hemispherical shell B;

a servo motor is fixedly connected to a middle portion of the support frame, a rotating driving post is connected to an upper end of the servo motor via a coupling, a slot is disposed at an upper end of the rotating driving post, and a protruding block is disposed at a lower end of the rotating mating post B and is inserted into the slot;

a support member is disposed on one side inside the hemispherical shell A, a plurality of connecting members are disposed on an inner circumferential surface of the hemispherical shell A in a manner of surrounding the support member, and a lamp tube component is inserted between every two adjacent ones of the connecting members; and the hemispherical shell A and the hemispherical shell B are capable of being opened or closed; when the hemispherical shell A and the hemispherical shell B are in a closed state, the plurality of lamp tube components are arranged around the support member to form an annular array; and when the hemispherical shell A and the hemispherical shell B are in an open state, the plurality of lamp tube components are configured to be mounted on the support member and arranged axially and linearly along the axis of the support member.

Preferably, the lamp tube component comprises fixed discs located at two ends of the lamp tube component, a connecting plate is fixedly connected between the two fixed discs, a blocking plate is fixedly connected to one side of the connecting plate, a rotatable lamp tube is rotatably and movably disposed between the two fixed discs, rotating blocks are fixedly connected to two side ends of the rotatable lamp tube, and a through slot is disposed at one end of each rotating block.

Preferably, four transverse striped color blocks of different colors are distributed around a surface of the rotatable lamp tube, and during rotation of the rotatable lamp tube, when one of the color blocks on the rotatable lamp tube rotates to the rear side, the other three color blocks are blocked by the connecting plate and the blocking plate at the rear side, such that only one color block is visible on the rotatable lamp tube.

Preferably, the connecting member comprises a connecting block fixedly connected to an inner end face of the hemispherical shell A, a semi-annular positioning plate is fixedly connected to one side end of the connecting block, a through hole is disposed through the connecting block, an inner circular groove is disposed in an inner side of the through hole, a rotating disc is rotatably disposed inside the inner circular groove, and a fixed transverse insertion block is fixedly connected to one end of the rotating disc and is inserted into the through slot.

Preferably, the through slot penetrates the entire fixed disc and extends to an outer side of the fixed disc, the through slot is insertably connected to the fixed transverse insertion block, a curved rotating post is fixedly connected to one end of each rotating disc, and one end of one of the curved rotating posts is fixedly connected to the rotating mating post B.

Preferably, the support member comprises a rotating pedestal post disposed at one side end of the hemispherical shell A, a top disc is movably disposed at an upper end of the rotating pedestal post, and a plurality of support plates are fixedly connected between an outer periphery of a lower end of the top disc and the hemispherical shell A; and a plurality of snap strips are fixedly connected to an upper end of the top disc, a positioning groove is disposed in the upper end of the rotating pedestal post, and a rotating mating post A is fixedly connected to a lower end of the rotating pedestal post.

Preferably, the plurality of lamp tube components are distributed in an annular array around the top disc inside the hemispherical shell A.

Preferably, when the plurality of lamp tube components are arranged linearly along the axis of the support member, the fixed disc of the lowermost lamp tube component is snap-fitted to the plurality of snap strips, and the rotating block at one end of the fixed disc is inserted into the positioning groove.

Preferably, a snap member is disposed between two adjacent ones of the lamp tube components and comprises an elastic snap strip and a movable transverse insertion block, the elastic snap strip is snap-fitted around a periphery of the fixed disc of the lamp tube component, and the movable transverse insertion block is inserted into the through slots in two opposite ones of the rotating blocks; and

- a plurality of snap sheets are fixedly connected to upper and lower ends of the elastic snap strip, and when the two lamp tube components are connected, the snap sheets abut against an outer wall of the fixed disc.

A second aspect of the present disclosure provides an adjustment method for a stage lighting apparatus with adjustable lighting properties, the method comprising the following steps:

- step A, inserting fixed discs on two sides of a connecting plate into semi-annular positioning plates, whereby a through slot in one side of a rotating block is insertably connected to a fixed transverse insertion block, thereby enabling the entire lamp tube component to be inserted between two connecting members, such that a plurality of lamp tube components are distributed in an annular array inside a hemispherical shell A;
- step B, activating a servo motor, wherein a rotating shaft at an upper end of the servo motor drives a rotating driving post and a rotating mating post B to rotate, the rotating mating post B further drives an internal slot to rotate, and the slot at one end of the rotating mating post B drives one of the rotating discs to rotate in an inner circular groove, thereby driving the entire connecting plate and a rotatable lamp tube to rotate,
- wherein four transverse striped color blocks of different colors are distributed around a surface of the rotatable lamp tube, and during rotation of the rotatable lamp tube, when one of the color blocks on the rotatable lamp tube rotates to the rear side, the other three color blocks are blocked by the connecting plate and a blocking plate at the rear side, such that only one color block is visible on the rotatable lamp tube, thereby achieving adjustment of the lighting properties; and
- step C, stopping the servo motor, detaching a hemispherical shell B from the hemispherical shell A, and rotating the entire hemispherical shell A, such that a protruding portion of a rotating mating post A at one end of a rotating pedestal post inside the hemispherical shell A is insertably connected to the rotating driving post, and then vertically mounting the entire lamp tube component on a top disc,
- wherein a lowermost fixed disc is inserted between a plurality of snap strips, and a rotating block at a lower end of the fixed disc is inserted into a positioning groove to fix the fixed disc at the bottom end; two adjacent ones of the fixed discs are snap-fitted via a snap member, such that the plurality of lamp tube components are vertically distributed on the top disc; and step B is then repeated to achieve lighting and adjustment of the lighting properties of the lamp tube components in the vertically arranged state.

Compared to the prior art, the present disclosure has the following advantageous effects:

1. In the present disclosure, a plurality of lamp tube components are disposed along an inner wall of the hemispherical shell to realize distribution in an annular array inside the hemispherical shell A and the hemispherical shell B, enabling the plurality of lamp tube components to achieve a spherical lighting state within the hemispherical shell A and the hemispherical shell B. After the hemispherical shell A and the hemispherical shell B are separated, the plurality of lamp tube components can be mounted on the support member inside the hemispherical shell A and arranged linearly via the snap members, allowing the lamp tube components as a whole to present a columnar lighting state. This allows for convenient switching between the spherical lighting state and the columnar lighting state.

2. In the present disclosure, four transverse striped color blocks of different colors, i.e., red, yellow, blue, and white, are distributed around a surface of the rotatable lamp tube. During rotation of the rotatable lamp tube, when one of the color blocks on the rotatable lamp tube rotates to the rear side, the other three color blocks are blocked by the connecting plate and the blocking plate at the rear side, such that only one color block is visible on the rotatable lamp tube, thereby achieving adjustment of the lighting properties.

BRIEF DESCRIPTION OF DRAWINGS

The present disclosure becomes more readily understood with reference to the drawings. It is to be readily understood by those skilled in the art that these drawings are provided for illustrative purposes only and are not intended to limit the scope of protection of the present disclosure. In addition, like reference numerals in the drawings are used to denote like parts, wherein.

Figure 1:
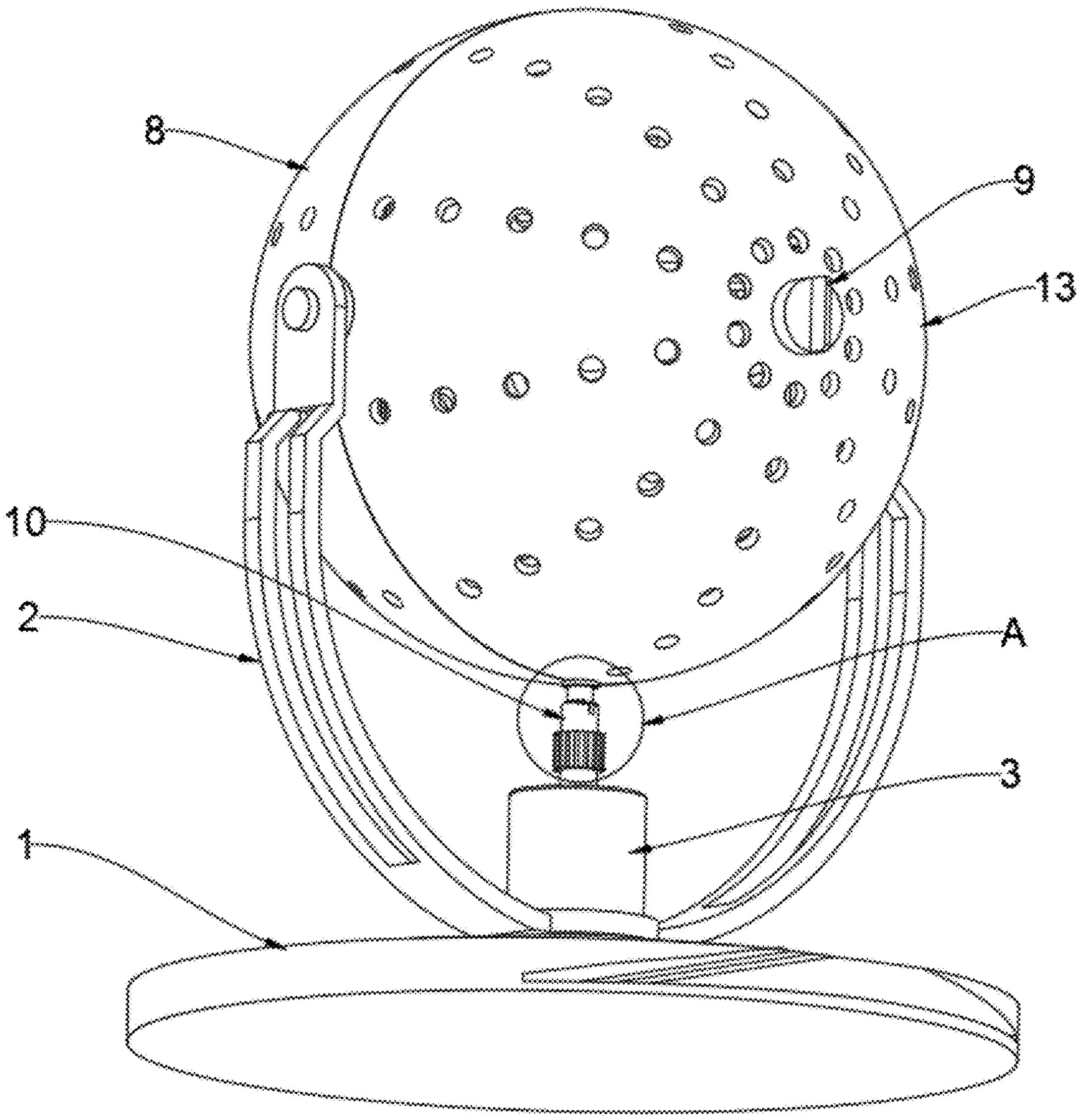
FIG. 1 is a schematic perspective view of an overall structure of the present disclosure.
Figure 2:
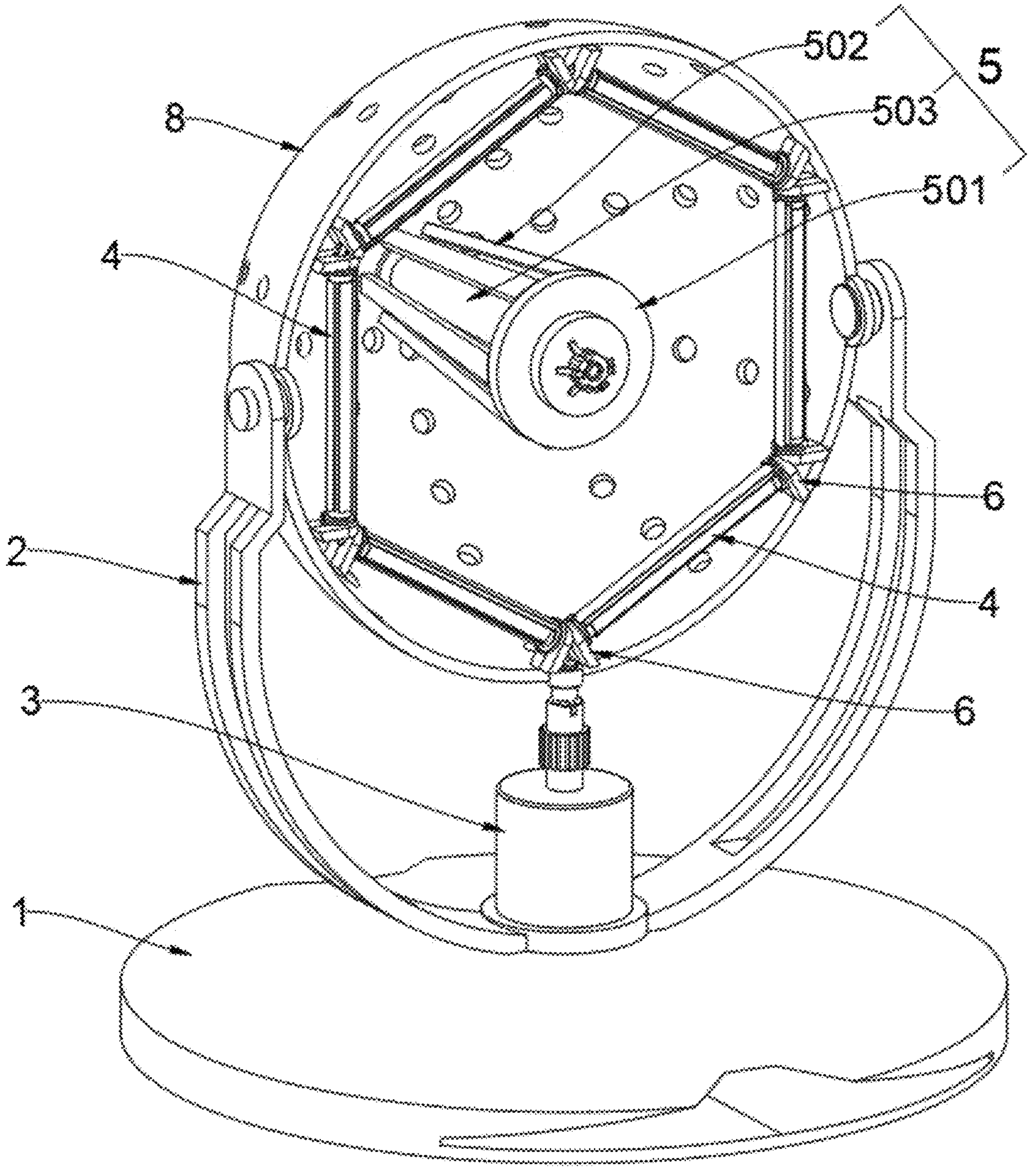
FIG. 2 is a perspective view of an internal structure of the present disclosure.
Figure 3:
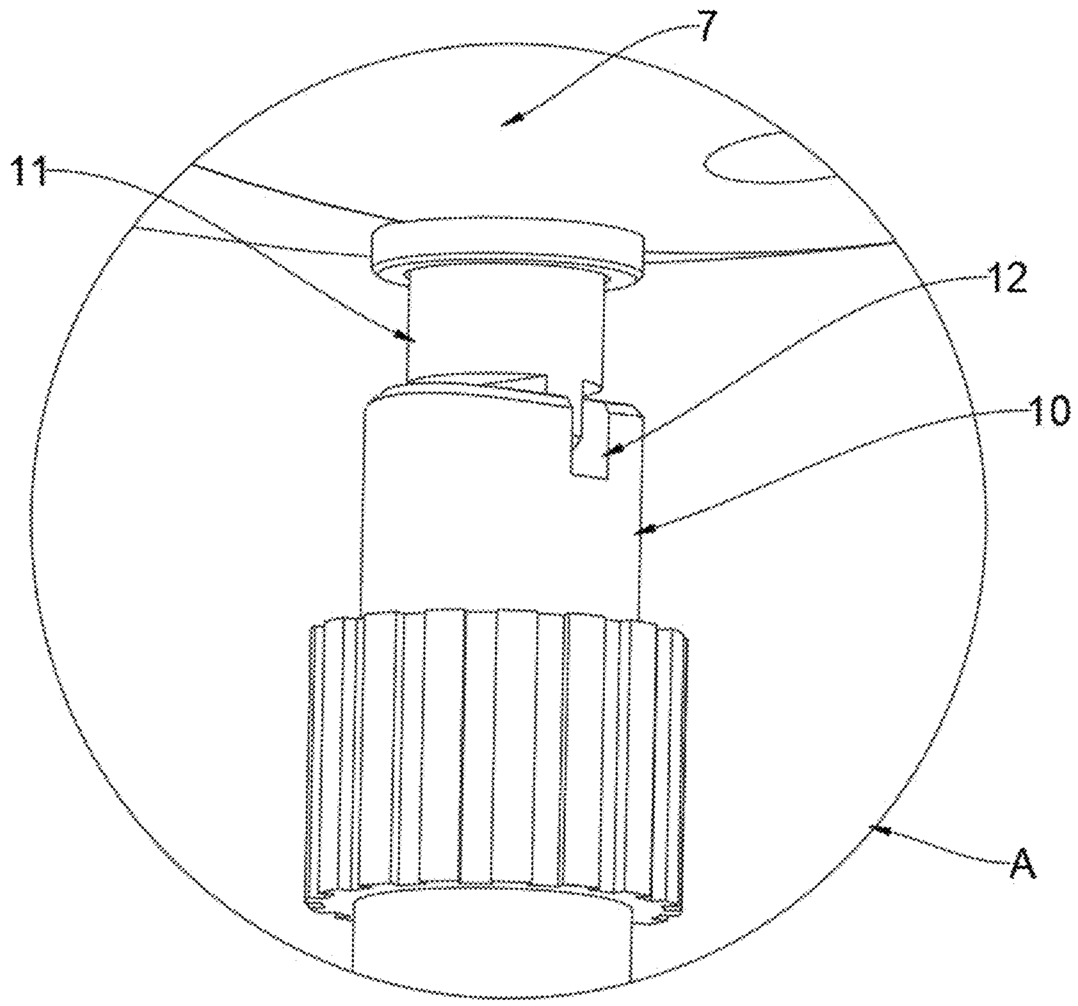
FIG. 3 is an enlarged perspective view at A in FIG. 1 of the present disclosure.
Figure 4:
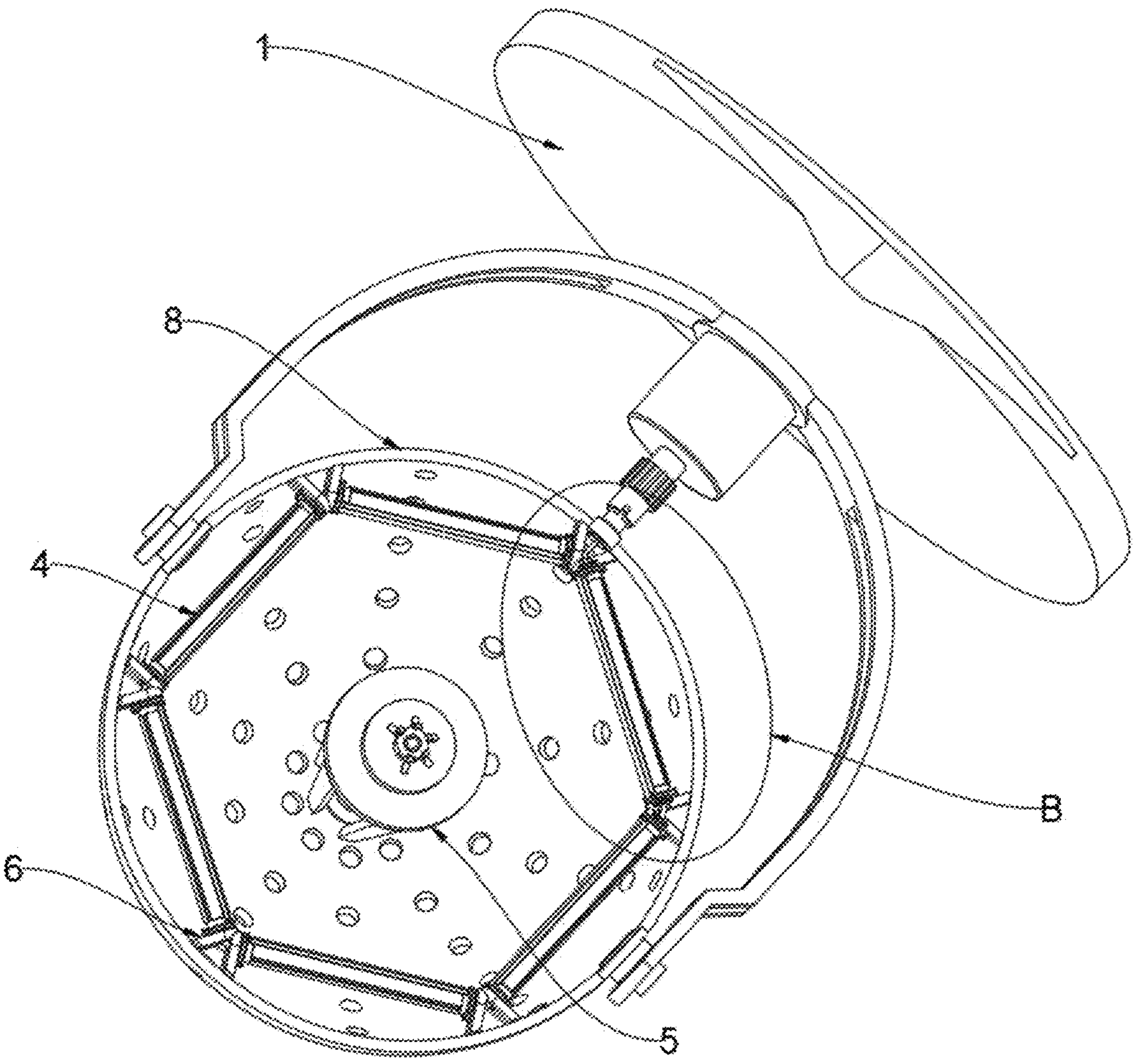
FIG. 4 is a perspective view from another viewpoint of an internal structure of the present disclosure.
Figure 5:
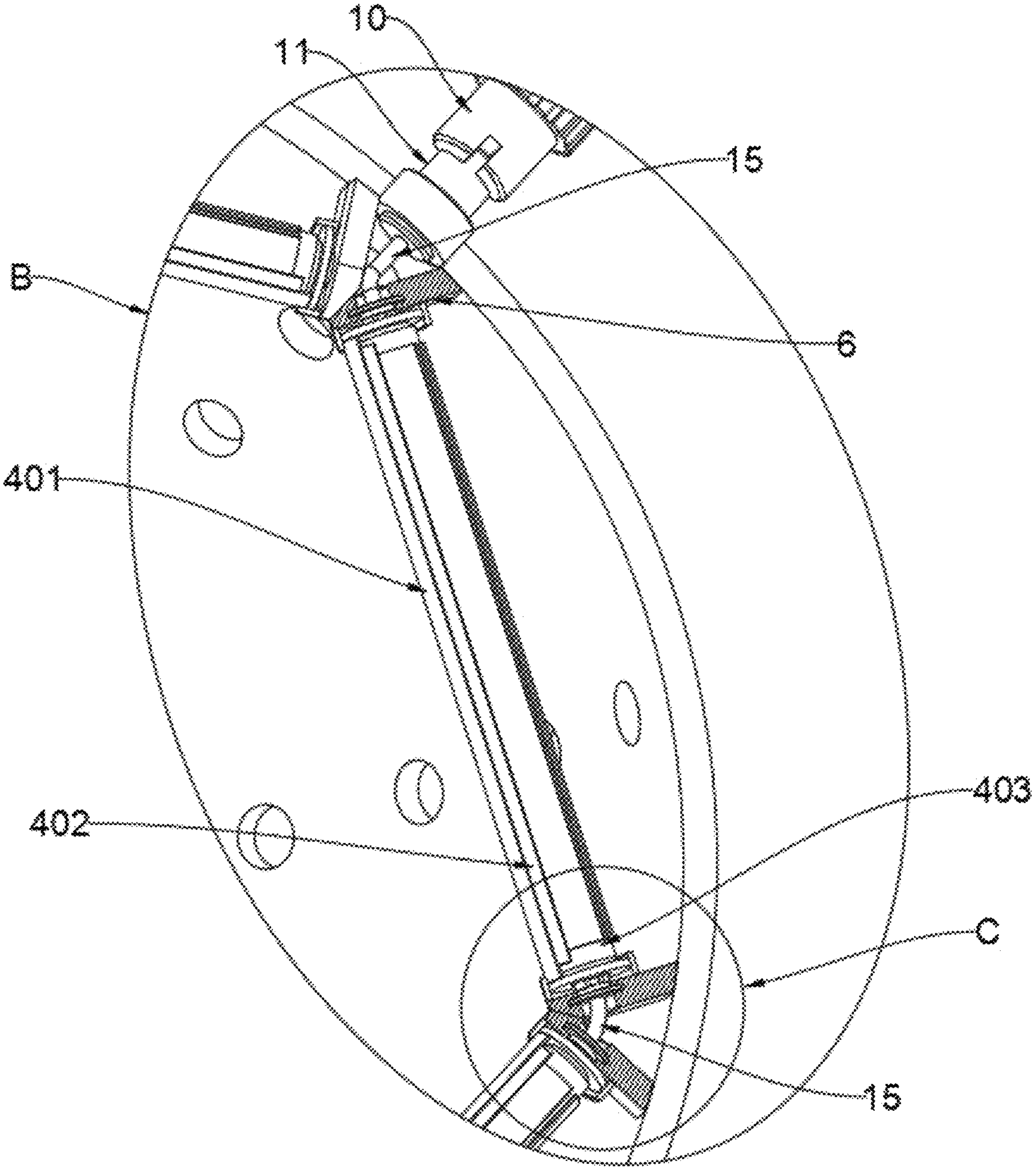
FIG. 5 is a perspective view at B in FIG. 4 of the present disclosure.
Figure 6:
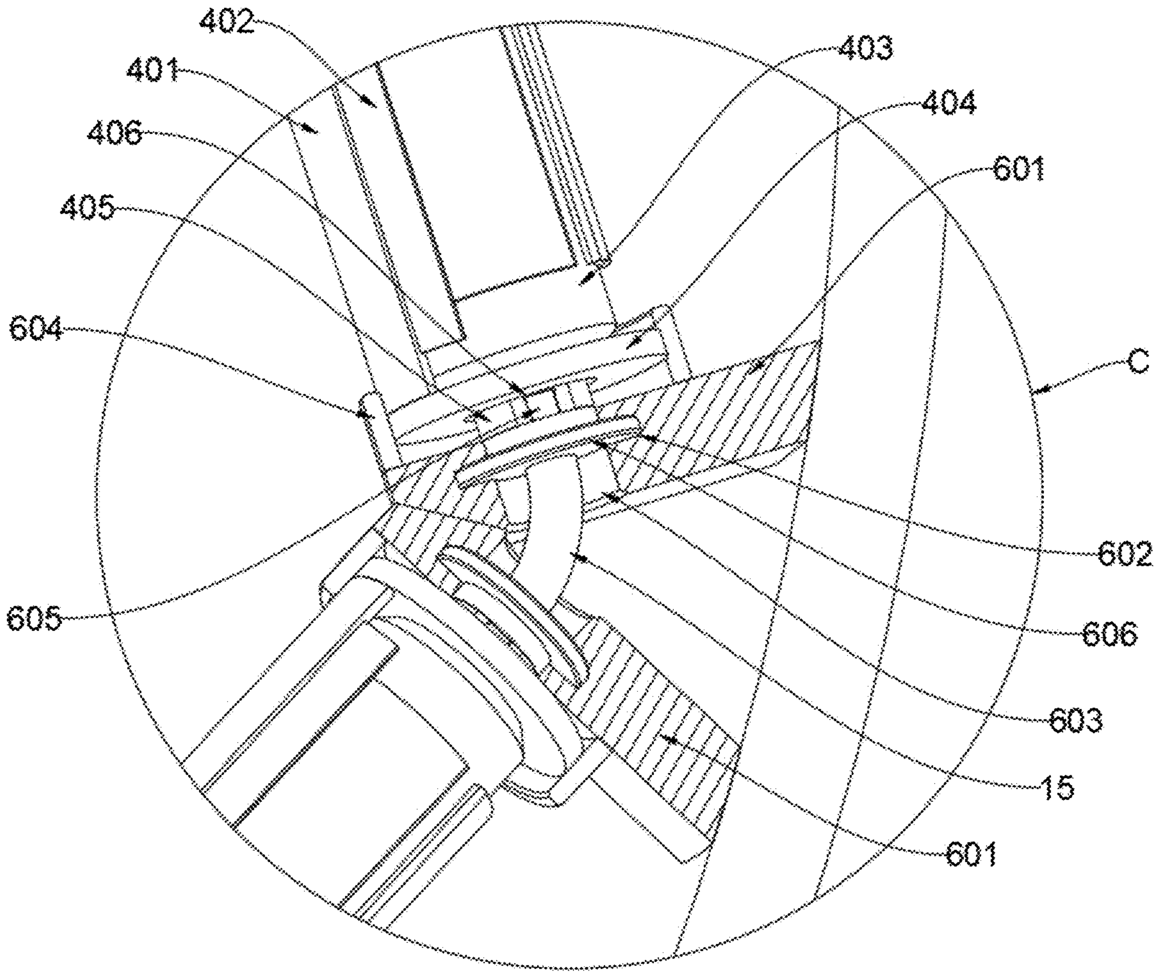
FIG. 6 is an enlarged perspective view at C in FIG. 5 of the present disclosure.
Figure 7:
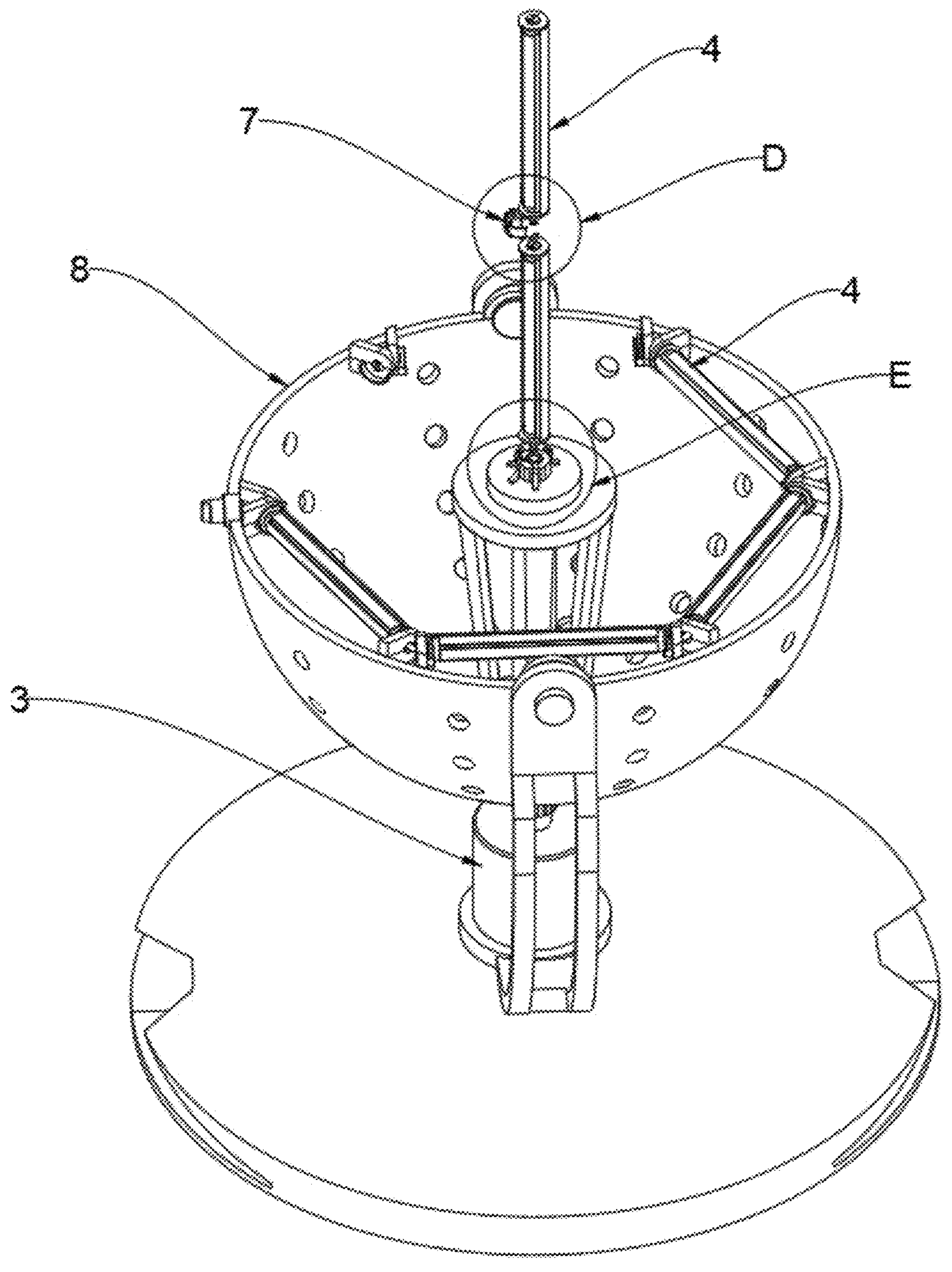
FIG. 7 is a spliced perspective view of another form of the present disclosure.
Figure 8:
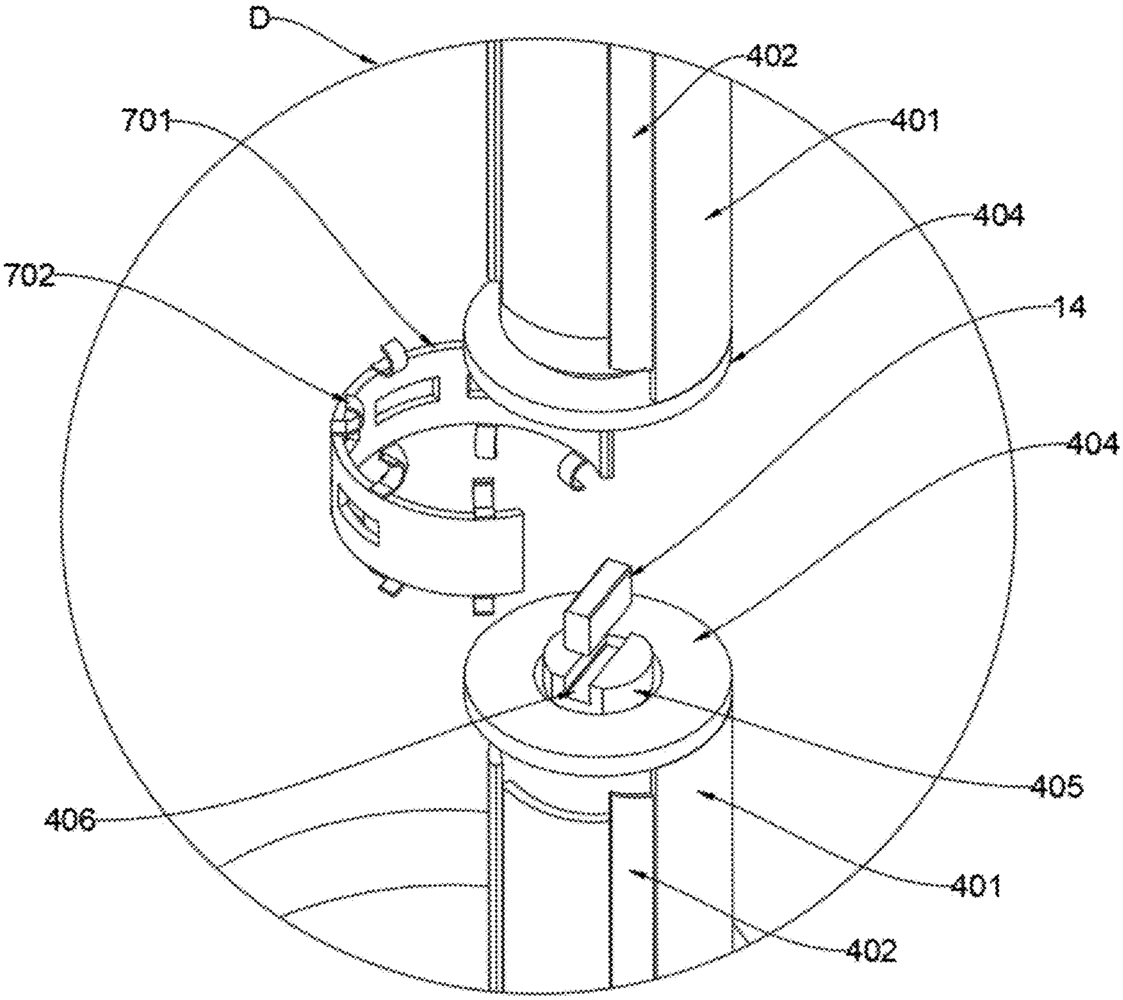
FIG. 8 is an enlarged perspective view at D in FIG. 7 of the present disclosure.
Figure 9:
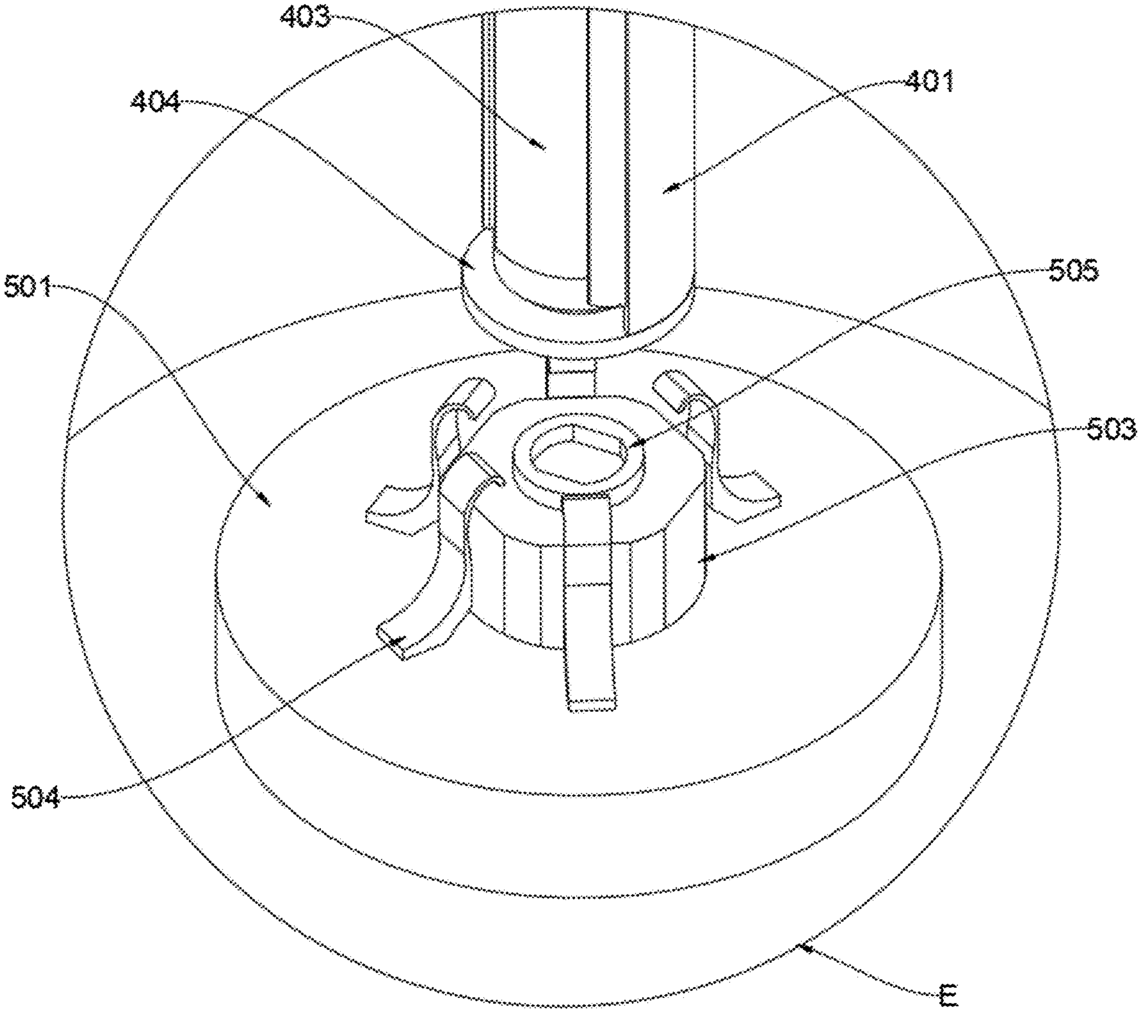
FIG. 9 is an enlarged perspective view at E in FIG. 7 of the present disclosure.

In the drawings: 1. Base; 2. Support frame; 3. Servo motor; 4. Lamp tube component; 401. Connecting plate; 402. Blocking plate; 403. Rotatable lamp tube; 404. Fixed disc; 405. Rotating block; 406. Through slot; 5. Support member; 501. Top disc; 502. Support plate; 503. Rotating pedestal post; 504. Snap strip; 505. Positioning groove; 6. Connecting member; 601. Connecting block; 602. Inner circular groove; 603. Through hole; 604. Semi-annular positioning plate; 605. Fixed transverse insertion block; 606. Rotating disc; 7. Snap member; 701. Elastic snap strip; 702. Snap sheet; 8. Hemispherical shell A; 9. Rotating mating post A; 10. Rotating driving post; 11. Rotating mating post B; 12. Slot; 13. Hemispherical shell B; 14. Movable transverse insertion block; 15. Curved rotating post.

DETAILED DESCRIPTION OF THE EMBODIMENTS

To make the objects, technical solutions, and advantages of embodiments of the present disclosure clearer, the technical solutions in the embodiments of the present disclosure are clearly and thoroughly described below with reference to the drawings in the embodiments of the present disclosure. It is apparent that the described embodiments are merely part of the embodiments of the present disclosure and not all of the embodiments. The components of the embodiments of the present disclosure, as described and illustrated in the drawings herein, may be arranged and designed in various different configurations.

Accordingly, the following detailed description of the embodiments of the present disclosure provided in the drawings is merely illustrative of the selected embodiments of the present disclosure and is not intended to limit the scope of the present disclosure as defined by the claims. All other embodiments obtained by those of ordinary skill in the art on the basis of the embodiments in the present disclosure without creative work shall fall within the scope of protection of the present disclosure.

It is to be noted that like reference numerals and letters indicate like items in the following drawings. Therefore, once an item is defined in one drawing, it is not necessary to be further defined and explained in the subsequent drawings.

In the description of the present disclosure, it is to be noted that the orientation or positional relationships indicated by the terms "upper", "lower", "left", "right", "vertical", "horizontal", "inner", "outer", etc., are on the basis of the orientation or positional relationships shown in the drawings, or the conventional orientation or positional relationships of the workpiece during use in the present disclosure. These terms are used merely to facilitate and simplify the description of the present disclosure, and are not intended to indicate or imply that apparatuses or elements referred to have a specific orientation or be constructed and operated in a specific orientation. Therefore, such terms cannot be construed as limitations of the present disclosure. In addition, the terms "first", "second", "third", etc., are merely used to distinguish descriptions and are not to be construed as indicating or implying relative importance. In the description of the present disclosure, the term "a plurality of" means two or more, unless otherwise specified.

In the description of the present disclosure, it is to be noted that, unless otherwise explicitly specified or limited, the terms "provide" and "connect" are to be interpreted in a broad sense. For example, they may refer to fixed connections, detachable connections, or integral connections, and may refer to mechanical or electrical connections. For those of ordinary skill in the art, the specific meanings of the terms mentioned above in the present disclosure may be construed according to specific circumstances.

In the present disclosure, unless otherwise explicitly specified or limited, a first feature being "above" or "below" a second feature may comprise cases where the first feature and the second feature are in direct contact, and cases where the first feature and the second feature are not in direct contact but are in contact via another feature therebetween. Moreover, the first feature being "over", "above", and "on" the second feature comprises that the first feature is directly above and obliquely above the second feature, or merely indicates that the first feature is at a higher level than the second feature. The first feature being "under", "below", and "beneath" the second feature comprises that the first feature is directly below and obliquely below the second feature, or merely indicates that the first feature is at a lower level than the second feature.

The embodiments of the present disclosure are described in detail below. Examples of the embodiments are shown in the drawings, wherein the same or similar reference numerals refer to the same or similar elements, or elements having the same or similar functions throughout. The embodiments described below with reference to the drawings are exemplary and are intended to explain the present disclosure, and shall not be construed as limiting the present disclosure.

Referring to FIGS. 1 to 6, the embodiments of the present disclosure provide a stage lighting apparatus with adjustable lighting properties, comprising a base 1, wherein a support frame 2 is fixedly connected to an upper end of the base 1, two ends of the support frame 2 are movably connected to a hemispherical shell A 8 via rotating shafts, one side of the hemispherical shell A 8 is snap-fitted to a hemispherical shell B 13, and a rotating mating post B 11 is movably disposed at lower ends of the hemispherical shell A 8 and the hemispherical shell B 13. A servo motor 3 is fixedly connected to a middle portion of the support frame 2, a rotating driving post 10 is connected to an upper end of the servo motor 3 via a coupling, a slot 12 is disposed at an upper end of the rotating driving post 10, and a protruding block is disposed at a lower end of the rotating mating post B 11 and is inserted into the slot 12.

A support member 5 is disposed on one side inside the hemispherical shell A 8, a plurality of connecting members 6 are disposed on an inner circumferential surface of the hemispherical shell A 8 in a manner of surrounding the support member 5, and a lamp tube component 4 is inserted between every two adjacent ones of the connecting members 6. The hemispherical shell A 8 and the hemispherical shell B 13 are capable of being opened or closed; when the hemispherical shell A 8 and the hemispherical shell B 13 are in a closed state, the plurality of lamp tube components 4 are arranged around the support member 5 to form an annular array; and when the hemispherical shell A 8 and the hemispherical shell B 13 are in an open state, the plurality of lamp tube components 4 are configured to be mounted on the support member 5 and arranged axially and linearly along the axis of the support member 5.

The hemispherical shell A 8 and the hemispherical shell B 13 of the present application may be made of a light-transmitting material, or may be provided with a plurality of hollow portions. The hollow portions may be of various regular or irregular shapes, such as circular, triangular, square, star-shaped, or the like, and function to facilitate light transmission and heat dissipation.

The hemispherical shell A 8 and hemispherical shell B 13 as a whole are rotatably movable on the support frame 2. By rotating the hemispherical shell A 8 and the hemispherical shell B 13, the rotating mating post B11 at one end of the hemispherical shell A 8 is oriented downward, and the protrusion at the lower end of the rotating mating post B11 is inserted into the slot 12 at the upper end of the rotating driving post 10. At this point, the rotating shaft at the upper end of the servo motor 3 drives the rotating driving post 10 which is connected to the upper end of the servo motor 3 via a coupling.

The connecting member 6 comprises a through hole 603 rotatably disposed at one side end of the hemispherical shell A 8. A connecting block 601 is movably disposed at an upper end of the through hole 603. A plurality of inner circular grooves 602 are fixedly connected between the periphery of the lower end of the connecting block 601 and the inner end face of the hemispherical shell A 8. A plurality of semi-annular positioning plates 604 are fixedly connected to an upper end of the connecting block 601. A rotating disc 606 is fixedly connected to the upper end of the through hole

603, and a rotating mating post A9 is fixedly connected to the lower end of the through hole 603.

The plurality of lamp tube components 4 are distributed in an axis array around the connecting block 601 inside the hemispherical shell A 8. The connecting member 6 above comprises a connecting block 601 fixedly connected to an inner end face of the hemispherical shell A 8, a semi-annular positioning plate 604 is fixedly connected to one side end of the connecting block 601, a through hole 603 is disposed through the connecting block 601, an inner circular groove 602 is disposed in an inner side of the through hole 603, a rotating disc 606 is rotatably disposed inside the inner circular groove 602, and a fixed transverse insertion block 605 is fixedly connected to one end of the rotating disc 606.

The lamp tube component 4 comprises a fixed disc 404 inserted into an inner side of the semi-annular positioning plate 604, a connecting plate 401 is fixedly connected to one side between the two fixed discs 404, a blocking plate 402 is fixedly connected to one side of the connecting plate 401, a rotatable lamp tube 403 is rotatably and movably disposed between the two fixed discs 404, rotating blocks 405 are fixedly connected to two side ends of the rotatable lamp tube 403, and a through slot 406 is disposed at one end of each rotating block 405.

The through slot 406 penetrates the entire fixed disc 404 and extends to an outer side of the fixed disc 404, the through slot 406 is insertably connected to the fixed transverse insertion block 605, a curved rotating post 15 is fixedly connected to one end of each rotating disc 606, and one end of one of the curved rotating posts 15 is fixedly connected to the rotating mating post B 11.

The fixed discs 404 on two sides of the connecting plate 401 are inserted into the semi-annular positioning plates 604, whereby the through slot 406 in one side of the rotating block 405 is insertably connected to the fixed transverse insertion block 605, thereby enabling the entire lamp tube component 4 to be inserted between two connecting members 6. As a result, the plurality of lamp tube components 4 are distributed in an annular array inside the hemispherical shell A 8, as shown in FIGS. 1 to 4. This array distribution enables the plurality of lamp tube components 4 to emit light inside the hemispherical shell A 8. Furthermore, the inner surface of the hemispherical shell A 8 is configured as a mirror surface, such that the hemispherical shell A 8 reflects the light emitted from the rotary lamp tube 403, thereby enhancing the luminous efficiency of the entire hemispherical shell A 8.

The rotating driving post 10 drives the rotating mating post B 11 at one end to rotate. The rotating mating post B 11 further drives an internal slot 12 to rotate. The slot 12 at one end of the rotating mating post B 11 drives one of the rotating discs 606 to rotate in the inner circular groove 602. The slot 12 exhibits high resilience, allowing it to rotate even while being bent. The rotation of the slot 12 drives the entire connecting plate 401 and the rotatable lamp tube 403 on the inner side of the fixed disc 404 to rotate.

Four transverse striped color blocks of different colors, i.e., red, yellow, blue, and white, are distributed around a surface of the rotatable lamp tube 403. During rotation of the rotatable lamp tube 403, when one of the color blocks on the rotatable lamp tube 403 rotates to the rear side, the other three color blocks are blocked by the connecting plate 401 and a blocking plate 402 at the rear side, such that only one color block is visible on the rotatable lamp tube 403, thereby achieving adjustment of the lighting properties.

Referring to FIGS. 7 to 11, another embodiment provided by the present disclosure is illustrated. When the plurality of lamp tube components 4 are arranged linearly along the longitudinal axis of the support member 5, the fixed disc 404 of the lowermost lamp tube component 4 is snap-fitted to the plurality of snap strips 504, and the rotating block 405 at one end of the fixed disc 404 is inserted into the positioning groove 505.

A snap member 7 is disposed between two adjacent ones of the lamp tube components 4 and comprises an elastic snap strip 701 and a movable transverse insertion block 14, the elastic snap strip 701 is snap-fitted around a periphery of the fixed disc 404 of the lamp tube component 4, and the movable transverse insertion block 14 is inserted into the through slots 406 in two opposite rotating blocks 405. A plurality of snap sheets 702 are fixedly connected to upper and lower ends of the elastic snap strip 701, and when the two lamp tube components 4 are connected, the snap sheets 702 abut against an outer wall of the fixed disc 404.

The lowermost fixed disc 404 is inserted between the plurality of semi-annular positioning plates 604, and the through slot 406 at the lower end of the fixed disc 404 is inserted into the rotating disc 606 to fix the fixed disc 404 at the bottom end. At this point, two adjacent ones of the fixed discs 404 are snap-fitted via the snap member 7, and the snap members 7 is configured such that each lamp tube component 4 can be fixedly connected in the vertical direction.

Figure 10:
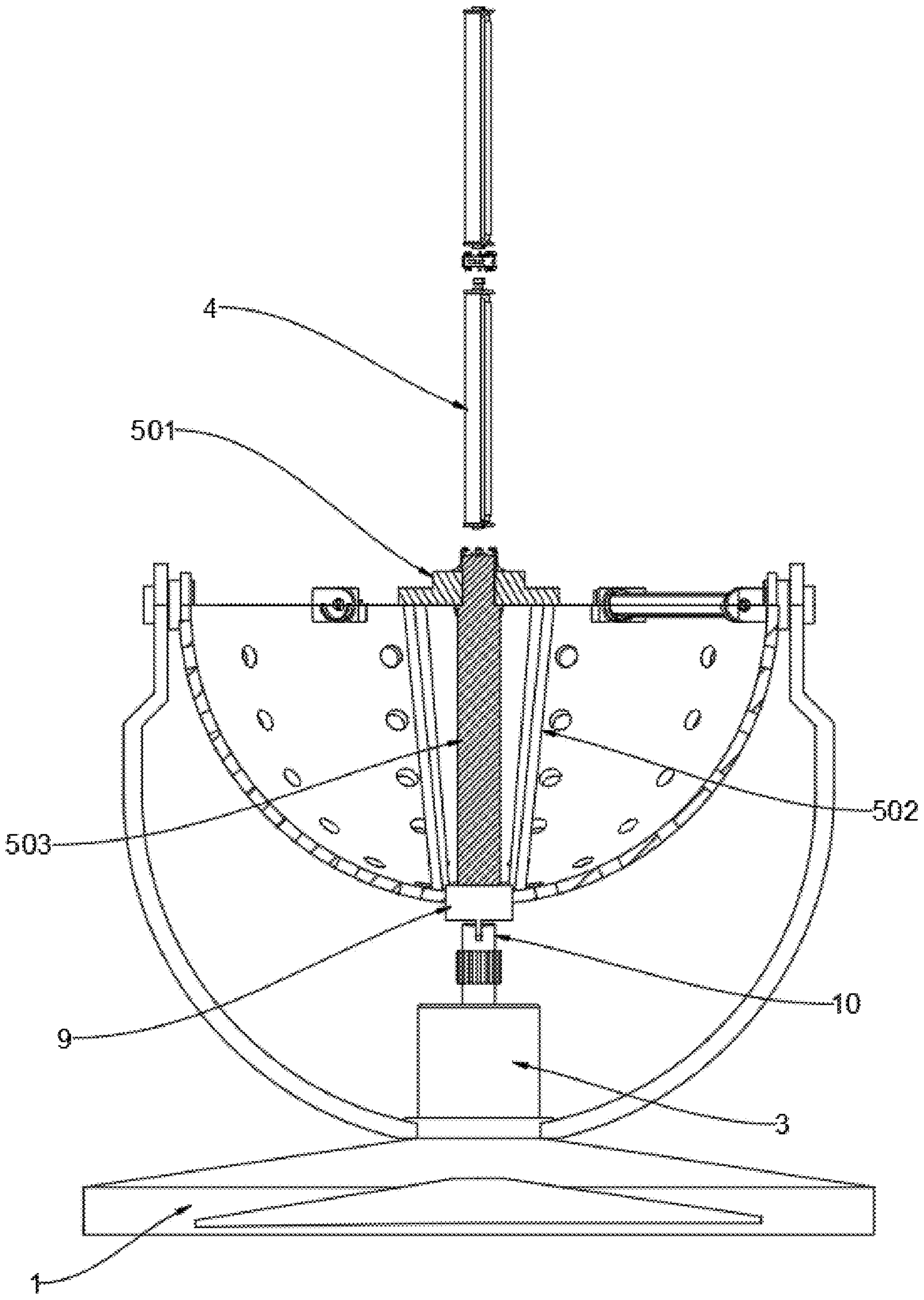
FIG. 10 is a front sectional view of another form of an overall spliced structure of the present disclosure.
Figure 11:
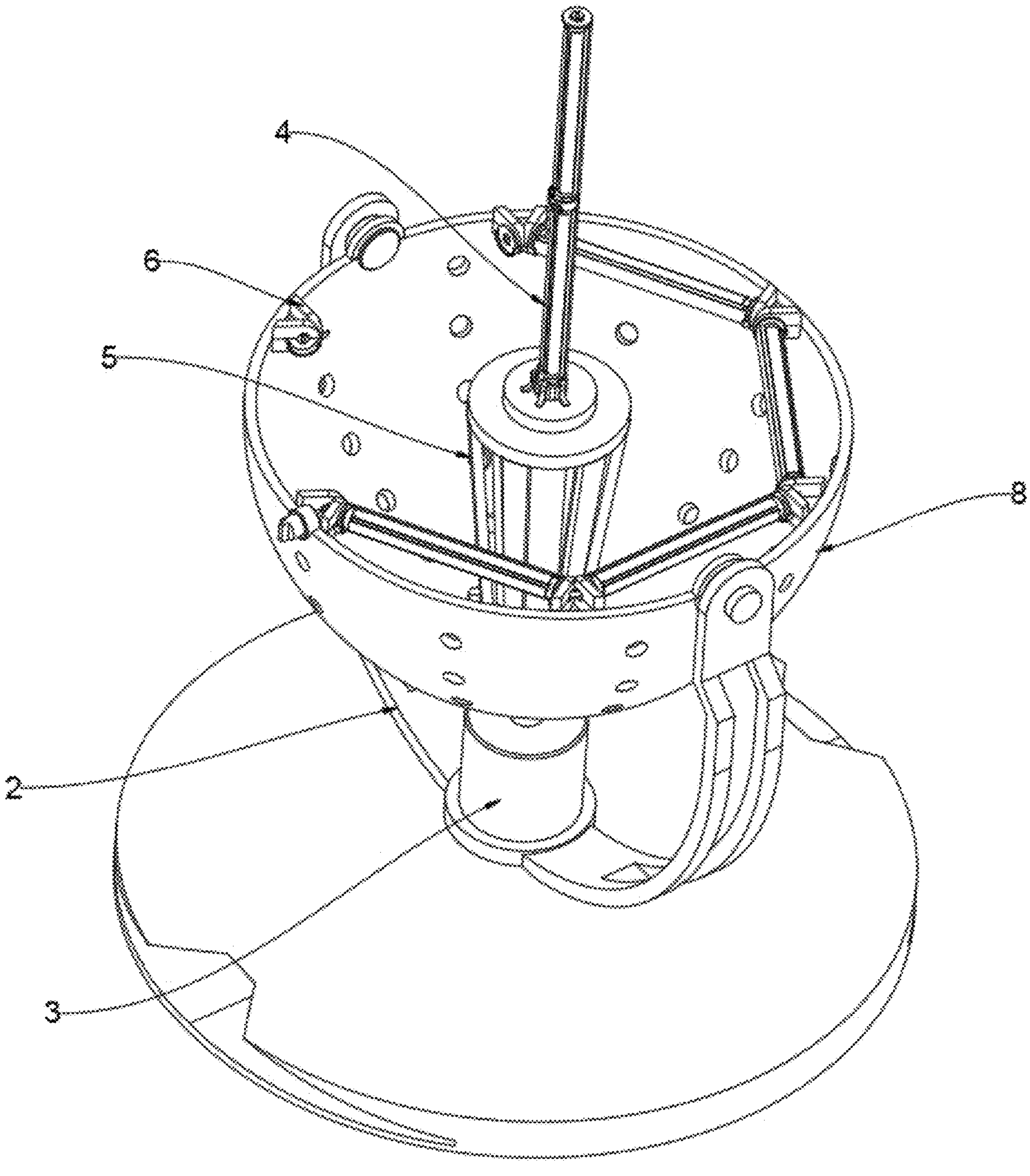
FIG. 11 is a perspective view of the spliced structure of another form of the present disclosure.

When two lamp tube components 4 are to be spliced, the two opposing fixed discs 404 are assembled together. The movable transverse insertion block 14 is inserted between two through slots 406, thereby splicing the two through slots 406 via the movable transverse insertion block 14. The elastic snap strip 701 is then fitted against one side of the two fixed discs 404, and the snap sheets 702 at the upper and lower ends of the elastic snap strip 701 are snap-fitted to the fixed discs 404, allowing the two fixed discs 404 to be positionally constrained together. The snap sheets 702 and the elastic snap strip 701 are made of an elastic metal material, thereby enabling a snap-fit connection between the two fixed discs 404. As a result, the lamp tube components 4 are ultimately arranged in a vertical array, as shown in FIGS. 10 and 11.

At this point, the servo motor 3 at the lower end is activated again, enabling the rotating shaft at the upper end of the servo motor 3 to drive the rotating driving post 10 and the rotating mating post A 9 to rotate. The rotating mating post A 9 then drives the through hole 603 at the upper end to rotate. The fixed disc 404 and the connecting plate 401 as a whole are secured by the plurality of semi-annular positioning plates 604 at the lower end, whereby the through hole 603 further drives the rotating disc 606 at the upper end to rotate. The rotating disc 606, in turn, drives the through slot 406 on the upper side and the rotatable lamp tube 403 to rotate.

The rotatable lamp tube 403 is rotated once again. When one of the color blocks on the rotatable lamp tube 403 rotates to the rear side, the other three color blocks are blocked by the connecting plate 401 and the blocking plate 402 at the rear side, such that only one color block is visible on the rotatable lamp tube 403. As a result, the lighting properties of the entire lamp tube component 4 can still be adjusted even when arranged in a vertical array.

Through the arrangement above, the plurality of lamp tube components 4 can be distributed in an annular array inside the hemispherical shell A 8 and the hemispherical shell B 13, enabling the plurality of lamp tube components 4 to achieve a spherical lighting state within the hemispherical shell A 8 and the hemispherical shell B 13. Additionally, the plurality of lamp tube components 4 can be arranged in a vertical array, allowing the lamp tube components 4 as a whole to present a columnar lighting state. Accordingly, the stage lighting apparatus enables adjustment between a spherical lighting state and a columnar lighting state through the cooperation of the connecting members 6 and the snap members 7.

This embodiment further provides an adjustment method for a stage lighting apparatus with adjustable lighting properties, the method comprising steps A to C.

At step A, fixed discs 404 on two sides of a connecting plate 401 are inserted into semi-annular positioning plates 604, whereby a through slot 406 in one side of a rotating block 405 is insertably connected to a fixed transverse insertion block 605, thereby enabling the lamp tube components 4 as a whole to be inserted between two connecting members 6. As a result, a plurality of lamp tube components 4 are distributed in an annular array inside a hemispherical shell A 8.

At step B, a servo motor 3 is activated, wherein a rotating shaft at an upper end of the servo motor 3 drives a rotating driving post 10 and a rotating mating post B 11 to rotate, the rotating mating post B 11 further drives an internal slot 12 to rotate, and the slot 12 at one end of the rotating mating post B 11 drives one of the rotating discs 606 to rotate in an inner circular groove 602, thereby driving the connecting plate 401 and a rotatable lamp tube 403 to rotate as a whole.

Four transverse striped color blocks of different colors are distributed around a surface of the rotatable lamp tube 403, and during rotation of the rotatable lamp tube 403, when one of the color blocks on the rotatable lamp tube 403 rotates to the rear side, the other three color blocks are blocked by the connecting plate 401 and a blocking plate 402 on the rear side, such that only one color block is visible on the rotatable lamp tube 403, thereby achieving adjustment of the lighting properties.

At step C, the servo motor 3 is stopped, a hemispherical shell B 13 is detached from the hemispherical shell A 8, and the entire hemispherical shell A 8 is rotated, such that a protruding portion of the rotating mating post A 9 at one end of a rotating pedestal post 503 inside the hemispherical shell A 8 is insertably connected to the rotating driving post 10. Then, the entire lamp tube component 4 is vertically mounted on a top disc 501.

A lowermost fixed disc 404 is inserted between a plurality of snap strips 504, and a rotating block 405 at a lower end of the fixed disc 404 is inserted into a positioning groove 505 to fix the fixed disc 404 at the bottom end; two adjacent ones of the fixed discs 404 are snap-fitted via a snap member 7, such that the plurality of lamp tube components 4 are vertically distributed on the top disc 501; and step B is then repeated to achieve lighting and adjustment of the lighting properties of the lamp tube components 4 in the vertical distribution state.

It is to be noted that the description above involves merely preferred embodiments of the present disclosure and the technical principles applied. It is to be understood by those skilled in the art that the present disclosure is not limited to the specific embodiments described herein, and that various obvious variation, modifications, and substitutions may be made by those skilled in the art without departing from the scope of protection of the present disclosure. Accordingly, although the present disclosure has been described in detail with reference to the embodiments above, the present disclosure is not limited to the embodiments above. Various other equivalent embodiments may be comprised without departing from the concept of the present disclosure, and the scope of the present disclosure is defined by the appended claims.

What is claimed is:

1. A stage lighting apparatus with adjustable lighting properties, comprising a base (1), wherein a support frame (2) is fixedly connected to an upper end of the base (1), two ends of the support frame (2) are movably connected to a hemispherical shell A (8) via rotating shafts, one side of the hemispherical shell A (8) is snap-fitted to a hemispherical shell B (13), and a rotating mating post B (11) is movably disposed at lower ends of the hemispherical shell A (8) and the hemispherical shell B (13);

a servo motor (3) is fixedly connected to a middle portion of the support frame (2), a rotating driving post (10) is connected to an upper end of the servo motor (3) via a coupling, a slot (12) is disposed at an upper end of the rotating driving post (10), and a protruding block is disposed at a lower end of the rotating mating post B (11) and is inserted into the slot (12);

a support member (5) is disposed on one side inside the hemispherical shell A (8), a plurality of connecting members (6) are disposed on an inner circumferential surface of the hemispherical shell A (8) in a manner of surrounding the support member (5), and a lamp tube component (4) is inserted between every two adjacent ones of the connecting members (6); and the hemispherical shell A (8) and the hemispherical shell B (13) are capable of being opened or closed; when the hemispherical shell A (8) and the hemispherical shell B (13) are in a closed state, the plurality of lamp tube components (4) are arranged around the support member (5) to form an annular array, such that the plurality of lamp tube components (4) present a spherical lighting state in the hemispherical shell A (8) and the hemispherical shell B (13); and when the hemispherical shell A (8) and the hemispherical shell B (13) are in an open state, the plurality of lamp tube components (4) are configured to be mounted on the support member (5) and arranged axially and linearly along the axis of the support member (5), such that the plurality of lamp tube components (4) present a columnar lighting state in the hemispherical shell A (8) and the hemispherical shell B (13).

2. The stage lighting apparatus with adjustable lighting properties according to claim 1, wherein the lamp tube component (4) comprises fixed discs (404) located at two ends of the lamp tube component (4), a connecting plate (401) is fixedly connected between the two fixed discs (404), a blocking plate (402) is fixedly connected to one side of the connecting plate (401), a rotatable lamp tube (403) is rotatably and movably disposed between the two fixed discs (404), rotating blocks (405) are fixedly connected to two side ends of the rotatable lamp tube (403), and a through slot (406) is disposed at one end of the rotating block (405).

3. The stage lighting apparatus with adjustable lighting properties according to claim 2, wherein four transverse striped color blocks of different colors are distributed around a surface of the rotatable lamp tube (403), and during rotation of the rotatable lamp tube (403), when one of the color blocks on the rotatable lamp tube (403) rotates to the rear side, the other three color blocks are blocked by the connecting plate (401) and the blocking plate (402) at the rear side, such that only one color block is visible on the rotatable lamp tube (403).

4. The stage lighting apparatus with adjustable lighting properties according to claim 3, wherein the connecting member (6) comprises a connecting block (601) fixedly connected to an inner end face of the hemispherical shell A (8), a semi-annular positioning plate (604) is fixedly connected to one side end of the connecting block (601), a through hole (603) is disposed through the connecting block (601), an inner circular groove (602) is disposed in an inner side of the through hole (603), a rotating disc (606) is rotatably disposed inside the inner circular groove (602), and a fixed transverse insertion block (605) is fixedly connected to one end of the rotating disc (606) and is inserted into the through slot (406).

5. The stage lighting apparatus with adjustable lighting properties according to claim 4, wherein the through slot (406) penetrates the entire fixed disc (404) and extends to an outer side of the fixed disc (404), the through slot (406) is insertably connected to the fixed transverse insertion block (605), a curved rotating post (15) is fixedly connected to one end of each rotating disc (606), and one end of one of the curved rotating posts (15) is fixedly connected to the rotating mating post B (11).

6. The stage lighting apparatus with adjustable lighting properties according to claim 3, wherein the support member (5) comprises a rotating pedestal post (503) disposed at one side end of the hemispherical shell A (8), a top disc (501) is movably disposed at an upper end of the rotating pedestal post (503), and a plurality of support plates (502) are fixedly connected between an outer periphery of a lower end of the top disc (501) and the hemispherical shell A (8); and a plurality of snap strips (504) are fixedly connected to an upper end of the top disc (501), a positioning groove (505) is disposed in the upper end of the rotating pedestal post (503), and a rotating mating post A (9) is fixedly connected to a lower end of the rotating pedestal post (503).

7. The stage lighting apparatus with adjustable lighting properties according to claim 6, wherein the plurality of lamp tube components (4) are arranged in an annular array around the top disc (501) inside the hemispherical shell A (8).

8. The stage lighting apparatus with adjustable lighting properties according to claim 6, wherein when the plurality of lamp tube components (4) are arranged linearly along the axis of the support member (5), the fixed disc (404) of the lowermost lamp tube component (4) is snap-fitted to the plurality of snap strips (504), and the rotating block (405) at one end of the fixed disc (404) is inserted into the positioning groove (505).

9. The stage lighting apparatus with adjustable lighting properties according to claim 8, wherein a snap member (7) is disposed between two adjacent ones of the lamp tube components (4) and comprises an elastic snap strip (701) and a movable transverse insertion block (14), the elastic snap strip (701) is snap-fitted around a periphery of the fixed disc (404) of the lamp tube component (4), and the movable transverse insertion block (14) is inserted into the through slots (406) in two opposite ones of the rotating blocks (405); and a plurality of snap sheets (702) are fixedly connected to upper and lower ends of the elastic snap strip (701), and when the two lamp tube components (4) are connected, the snap sheets (702) abut against an outer wall of the fixed disc (404).

10. An adjustment method for the stage lighting apparatus with adjustable lighting properties according to claim 1, wherein the adjustment method comprises:

step A: inserting fixed discs (404) on two sides of a connecting plate (401) into semi-annular positioning plates (604), whereby a through slot (406) in one side of a rotating block (405) is insertably connected to a fixed transverse insertion block (605), thereby enabling the entire lamp tube component (4) to be inserted between two connecting members (6), such that a plurality of lamp tube components (4) are arranged in an annular array inside the hemispherical shell A (8);

step B: activating the servo motor (3), wherein a rotating shaft at an upper end of the servo motor (3) drives the rotating driving post (10) and the rotating mating post B (11) to rotate, the rotating mating post B (11) further drives the internal slot (12) to rotate, and the slot (12) at one end of the rotating mating post B (11) drives one of a plurality of rotating discs (606) to rotate in an inner circular groove (602), thereby driving the entire connecting plate (401) and a rotatable lamp tube (403) to rotate, wherein four transverse striped color blocks of different colors are distributed around a surface of the rotatable lamp tube (403), and during rotation of the rotatable lamp tube (403), when one of the color blocks on the rotatable lamp tube (403) rotates to the rear side, the other three color blocks are blocked by the connecting plate (401) and a blocking plate (402) at the rear side, such that only one color block is visible on the rotatable lamp tube (403), thereby achieving adjustment of the lighting properties; and step C: stopping the servo motor (3), detaching the hemispherical shell B (13) from the hemispherical shell A (8), and rotating the entire hemispherical shell A (8), such that a protruding portion of a rotating mating post A (9) at one end of a rotating pedestal post (503) inside the hemispherical shell A (8) is insertably connected to the rotating driving post (10), and then vertically mounting the entire lamp tube component (4) on a top disc (501), wherein a lowermost fixed disc (404) is inserted between a plurality of snap strips (504), and the rotating block (405) at a lower end of the fixed disc (404) is inserted into a positioning groove (505) to fix the fixed disc (404) at the bottom end; two adjacent ones of the fixed discs (404) are snap-fitted via a snap member (7), such that the plurality of lamp tube components (4) are vertically distributed on the top disc (501); and step B is then repeated to achieve lighting and adjustment of the lighting properties of the lamp tube components (4) in the vertically distributed state.

* * * * *